US006246733B1

United States Patent
Hutchins

(10) Patent No.: US 6,246,733 B1
(45) Date of Patent: Jun. 12, 2001

(54) SYNCHRONOUS INTERFACE FOR ASYNCHRONOUS DATA DETECTION CHANNELS

(75) Inventor: Robert Allen Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/081,607

(22) Filed: May 20, 1998

(51) Int. Cl.[7] .............................. H04L 7/00; H04L 25/30
(52) U.S. Cl. ............................ 375/355; 375/290; 360/51
(58) Field of Search ..................................... 375/355, 340, 375/363, 290, 362, 364, 376, 371, 372; 369/47, 48; 360/51; 341/59, 67; 328/72; 327/291

(56) References Cited

U.S. PATENT DOCUMENTS

| | | | |
|---|---|---|---|
| 4,756,010 | * 7/1988 | Nelson et al. | 375/340 |
| 5,268,934 | 12/1993 | Sharma et al. | 375/117 |
| 5,379,327 | * 1/1995 | Sharma et al. | 375/377 |
| 5,418,930 | 5/1995 | Swarts | 395/500 |
| 5,438,460 | 8/1995 | Coker et al. | 360/46 |
| 5,461,642 | * 10/1995 | Hutchins et al. | 360/51 |
| 5,675,565 | 10/1997 | Taguchi et al. | 369/59 |
| 5,680,380 | 10/1997 | Taguchi et al. | 369/48 |
| 5,680,383 | 10/1997 | Clark et al. | 369/59 |

* cited by examiner

*Primary Examiner*—Tesfaldet Bocure
(74) *Attorney, Agent, or Firm*—John H. Holcombe; Robert M. Sullivan

(57) ABSTRACT

A synchronous interface is provided for an asynchronous channel, for example, a read channel for a variable velocity magnetic tape, the channel providing asynchronous samples of an input signal from a fixed clock. The input signal, for example, comprises PRML data, written based upon synchronous write clock boundaries. The synchronous interface of the invention presents estimated synchronous samples at estimated write clock boundaries to allow decoding of the input signal. A phase estimator is coupled to the asynchronous channel for estimating the timing offset of the input signal synchronous write clock boundaries from the asynchronous samples. A sample estimator is coupled to the asynchronous channel and to the phase estimator for estimating, from two sequential asynchronous samples bounding an input signal synchronous write clock boundary, the input signal amplitudes at the estimated timing offset from the asynchronous samples. Thus, the estimated input signal amplitudes are substantially synchronized with the input signal synchronous write clock boundaries.

16 Claims, 4 Drawing Sheets

SYNCHRONOUS INTERFACE FOR ASYNCHRONOUS DATA DETECTION CHANNELS

DOCUMENTS INCORPORATED BY REFERENCE

Commonly assigned U.S. application Ser. No. 09-039,124, "Method and Apparatus for Performing Digital Detection of Data Stored on an Optical Medium", Hutchins et al., filed Mar. 13, 1998, is incorporated for its showing of a system and method for estimating the mid-point between two sample points.

TECHNICAL FIELD

This invention relates to the detection of data which has synchronous data recording characteristics, such as partial response maximum likelihood (PRML) data, and, more particularly, to the detection of such data with an asynchronous data detection channel.

BACKGROUND OF THE INVENTION

The recording of data on a moving memory device, such a magnetic data storage media, is best accomplished by means of NRZ (non-return to zero) recording in which the data is self-clocking without separate clock signals. Thus, only data is recorded in the media and no space is "wasted" for the recording of clock signals. To accomplish such recording, the recording signal in a track comprises a sequence of regular intervals, wherein a recorded signal (such as a transition between magnetic polarities) appearing in an interval is designated as a "1" and the absence of a signal in an interval is designated as a "0". The location in each interval at which a recorded signal (transition) may appear or be absent from is called a synchronous location.

A method for encoding and detecting such data is a partial response maximum likelihood (PRML) data reproduction method. The data is coded into a run-length limited code and modulated in accordance with a partial response characteristic imposed on a time-related sequence of synchronous locations as in known in the art.

Various types of PRML recording are employed for various recording media. A type of PRML recording which is advantageously employed for magnetic recording media is Class IV PRML recording which employs a plurality of intermediate synchronous sample points for each transition location. The intermediate synchronous sample points are called synchronous write clock boundaries. Thus, the encoded data is recorded on a track as a sequence of variably spaced transitions having a particular relationship to the write clock boundaries.

The reproduction of the data as sensed at the readback transducer therefore requires that the readback signals be detected at the synchronous write clock boundaries. The maximum likelihood detection and decoding may then be conducted to recreate the original data. Ideally, the read channel waveform, when detected at the synchronous write clock boundaries, provides integer-type relationships to one another. Examples are −2, −1, 0, 1 and 2 for EPR4 (Extended Partial Response Class IV), and −1, 0 and 1 for PR4 (Partial Response Class IV).

PRML recording provides an excellent signal to noise characteristic and low error rate as compared to conventional peak detection of run length limited codes, therefore allowing the recording of data at higher recording densities. High density recording provides many advantages, such as higher capacity for the same types of data recording media.

Ideally, the track is moved past a readback transducer at a fixed speed, and the write clock boundaries are presented at a regular rate so that the recorded signals are appropriately aligned and spaced to allow generation by the readback transducer of equal and appropriately spaced electrical pulses for detection at the synchronous write clock boundaries by a sample clock for an ML detection channel.

Magnetic disk drives operate at fixed rotational speeds with the data recorded in a series of concentric tracks. Thus, the track velocity is relatively constant and the recorded signals are presented to the read channel at a regular rate, so that the sample clock provides samples at the write clock boundaries with only minor adjustments to the sample clock by a PLL (phase-locked-loop). This allows the ML detection channel to work optimally.

Conventional magnetic tape employs peak detection for decoding the data, rather than PRML. A difficulty of employing PRML with magnetic tape is that tape speeds are highly variable. Many magnetic tape drives access specific sections of the tape, possibly by stopping and reversing direction. For example, such magnetic tape drives may have a nominal velocity of 2 m/s and an acceleration rate of 2,000 m/s$^2$. Also, the tape is simultaneously unwrapped from a supply reel, whose wrap radius is constantly being reduced, and wrapped onto a take up reel, whose wrap radius is constantly increasing, requiring that the reel motors constantly change speeds to produce approximately the same velocity across the readback transducer. Further, the tape does not always move across the readback transducer in a perfectly straight path, and may wander from side to side. Thus, the resultant velocity variations may be up to 15%.

Additionally, magnetic tape typically comprises a plurality of parallel tracks which are recorded and are read simultaneously. Thus, digital sample clocks may be employed and use global frequency averaging to control the clock timing, i.e., average the clocks across all the tracks. The digital clocks operate at a fixed frequency with a digital PLL to identify the transitions and maintain a phase lock on the input readback signal.

Typically, the read channel is sampled at a higher rate than the write clock rate. For example, the read sample clock operates at 1.25 times the write clock rate. In a digital channel, the read clock is generated by a fixed oscillator independently from the waveform that is being read from the tape. The PLL operates using this fixed oscillator to determine where the write clock boundaries occurred. The PLL does so without affecting the sample clock rate. Instead, it mathematically tracks the waveform that is being read from the tape.

Thus, the fixed samples are asynchronous and are independent from the synchronous write clock boundaries of the input signal, and present a highly variable relationship. No synchronous samples are therefore provided that could be used by an ML detector.

SUMMARY OF THE INVENTION

It is an object of the present invention to provide a synchronous interface for an asynchronous channel, the synchronous interface presenting estimated synchronous samples at estimated write clock boundaries.

Disclosed is a synchronous interface for an asynchronous channel, the channel providing asynchronous samples of an input signal, the input signal having synchronous write clock boundaries. A phase estimator is coupled to the asynchronous channel for estimating the timing offset of the input signal synchronous write clock boundaries from the asynchronous samples. A sample estimator is coupled to the asynchronous channel and to the phase estimator for estimating, from two sequential asynchronous samples bounding an input signal synchronous write clock boundary, the input signal amplitudes at the estimated timing offset from the asynchronous samples. Thus, the estimated input signal amplitudes are substantially synchronized with the input signal synchronous write clock boundaries.

The phase estimate is preferably accomplished by interpolating between sequential asynchronous sample clocks for determining the estimated timing offset of the input signal synchronous write clock boundaries.

The sample estimate is preferably accomplished by interpolating the amplitude of the input signal between two sequential asynchronous samples, at the estimated timing offset from the asynchronous samples.

Additionally, in a digital synchronous interface, a digital midpoint estimator estimates the midpoint between two sequential asynchronous digital samples, and a digital sample interpolator interpolates the amplitude of the input signal between the midpoint and the one of the two sequential asynchronous digital samples closest to the estimated timing offset.

The invention is primarily intended for a maximum likelihood detection channel for the detection of recorded magnetic PRML signals, the channel having a sample detector providing asynchronous digital samples of the signals. The method of the present invention estimates the offset of the input signal synchronous write clock boundaries from the timing of the sequential asynchronous samples, and estimates, from two sequential asynchronous samples, the input signal bounded thereby at the estimated synchronous timing write clock boundaries.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
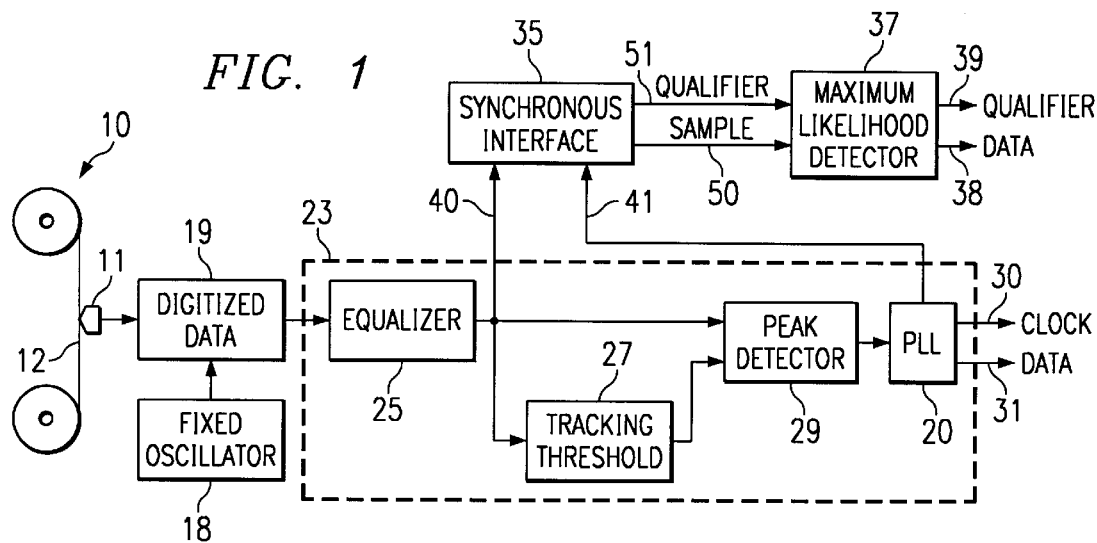
FIG. 1 is a diagrammatic representation of an embodiment of a magnetic tape drive and data detection channel in accordance with the present invention.
Figure 2:
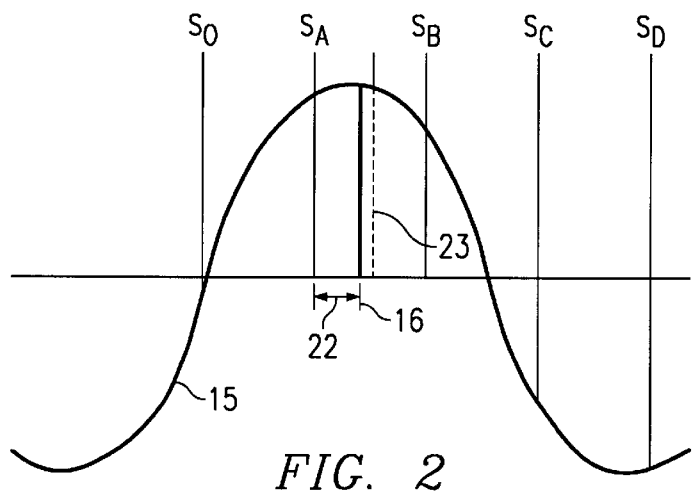
FIG. 2 is a graphical representation of an exemplary input signal and sample points in accordance with the data detection channel of FIG. 1.

Referring to FIGS. 1 and 2, an embodiment of the present invention is illustrated as employed with a magnetic tape drive 10, having a readback transducer 11. The readback transducer reads a synchronous data track (preferably, of a set of parallel data tracks) recorded on a magnetic tape 12.

The synchronous data track may comprise any conventional synchronous data recording. A preferred encoding method for such data is a partial response maximum likelihood (PRML) data encoding method. The data is coded into a run-length limited code and modulated in accordance with a partial response characteristic imposed on a time-related sequence of synchronous locations, as described above.

Various types of PRML recording are employed for various recording media. A type of PRML recording which is advantageously employed for magnetic recording media is Class IV PRML recording which employs a plurality of intermediate synchronous sample points for each transition location. The intermediate synchronous sample points are called synchronous write clock boundaries. An exemplary encoded waveform 15 is illustrated in FIG. 2. Thus, the encoded data is recorded on a track as a sequence of variably spaced transitions having a particular relationship to the write clock boundaries. For the purpose of illustration, the waveform 15 is shown at its highest frequency, with closely spaced transitions.

The reproduction of the data as sensed at the readback transducer therefore requires that the readback signals be detected at the synchronous write clock boundaries, e.g., write clock boundary 16. The maximum likelihood detection and decoding may then be conducted to recreate the original data.

As described above, the tape signal is read by the tape readback head at highly variable track velocities. The channel is typically an asynchronous digital channel, with the sample clock driven independently from the data track. Typically, the read channel is sampled at a higher rate than the nominal write clock rate. For example, the read sample clock operates at 1.25 times the write clock rate. In a digital channel, the read clock is generated by a fixed oscillator 18, illustrated in FIG. 1, which operates a data sampler and digitizer 19, independently from and asynchronously with respect to, the waveform 15 that is being read from the tape. The oscillator 18 and data sampler and digitizer 19 are conventional circuits, which may be used in a conventional digital peak detector. In FIG. 2, the sampling of the data sampler and digitizer 19 is generated by the fixed oscillator 18 at sample times $S_0$–$S_D$, which are at fixed time intervals, asynchronous to the waveform 15, and its write clock boundaries.

The PRML exemplary EPR4 waveform 15 comprises approximately 5 write clock boundaries for each complete sine wave cycle. For the purpose of illustration, only write clock boundary 16 is illustrated.

An embodiment of the method of the present invention comprises estimating, from the timing of a PLL 20, and of asynchronous samples (e.g., samples $S_A$ and $S_B$), the timing offset 22 of the input signal synchronous write clock boundaries (e.g., write clock boundary 16) from the timing of the sequential asynchronous samples. Once the timing offset 22 has been estimated, the method of the present invention estimates, from two sequential asynchronous samples (e.g., the amplitudes of samples $S_A$ and $S_B$), the input signal at the estimated synchronous timing write clock boundaries (e.g., write clock boundary 16). To provide a more precise estimate, the estimate may be made from a midpoint interpolation (e.g., midpoint 23 between samples $S_A$ and $S_B$), and the sample closest to the write clock boundary (e.g., sample $S_A$).

Referring to the embodiment of FIG. 1, the digitized data is preferably supplied to a digital channel 23, which may include a digital equalizer 25, such as a conventional FIR (finite impulse response) filter, a tracking threshold 27, a peak detector 29, and the digital PLL 20. Digital channel 23 may alternatively function as a conventional digital peak detector channel for reading non-PRML recorded data and supply the detected data at clock and data outputs 30 and 31, respectively.

In accordance with the present invention, a synchronous interface 35 estimates the synchronous timing of the asynchronous samples, and estimates, from two sequential asynchronous samples, the input signal at the estimated synchronous timing. The estimated synchronous samples are then supplied to a maximum likelihood detector 37, which may comprise a conventional digital ML detector, that provides the decoded data on line 38 together with a signal on line 39 indicating that the decoded data is correct. The synchronous interface 35 is coupled to output 40 of equalizer 25 and to output 41 of PLL 20.

Figure 3:
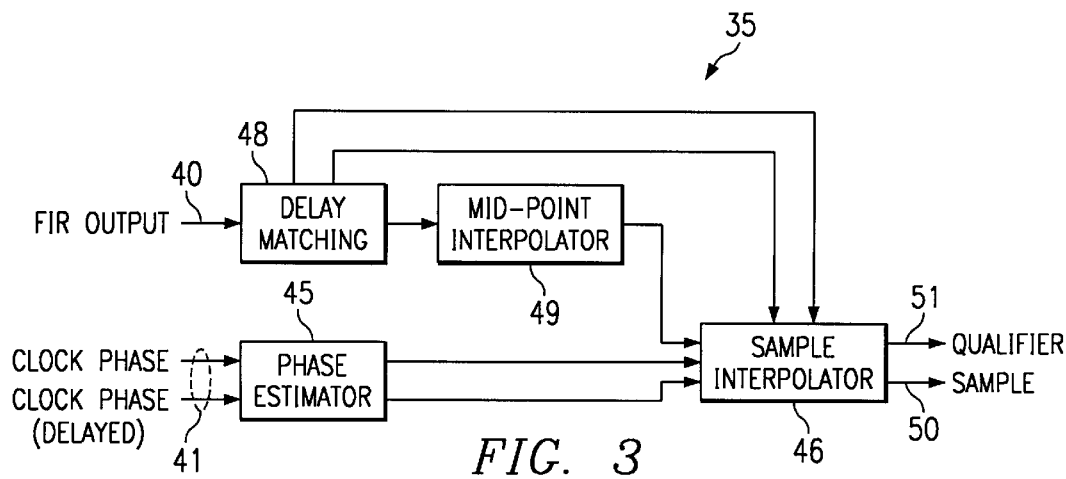
FIG. 3 is a block diagram of an embodiment of a synchronous interface of the data detection channel of FIG. 1 in accordance with the present invention.

An embodiment of a synchronous interface 35 is illustrated in FIG. 3. A phase estimator 45 is coupled to output 41 of the PLL and estimates the synchronous timing of the asynchronous samples, and provides the timing estimates to a sample interpolator 46. The output 40 of the equalizer is provided to a delay matching circuit 48 which provides the sensed samples to sample interpolator 46 at delay times matching the calculation times for the phase estimator 45. A midpoint estimator 49 optionally provides midpoint estimates between the samples at output 40 and supplies the midpoint estimates to sample interpolator 46 for providing better estimates of the input signal at the synchronous write clock boundary between the samples from the delay matching circuit 48. The sample interpolator 46 provides the resultant estimated sample values for the input signal at the synchronous write clock boundaries on output 50 and indicates that the outputs are valid by means of a qualification signal on output 51.

Figure 4:
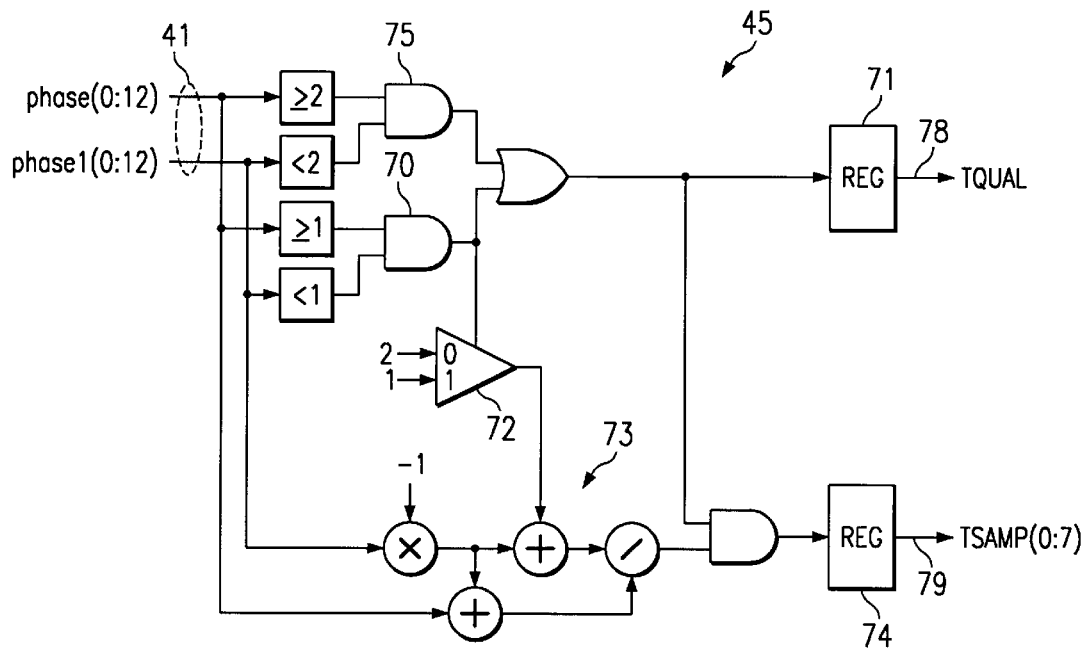
FIG. 4 is a block diagram of an embodiment of phase estimator of FIG. 3.
Figure 5:
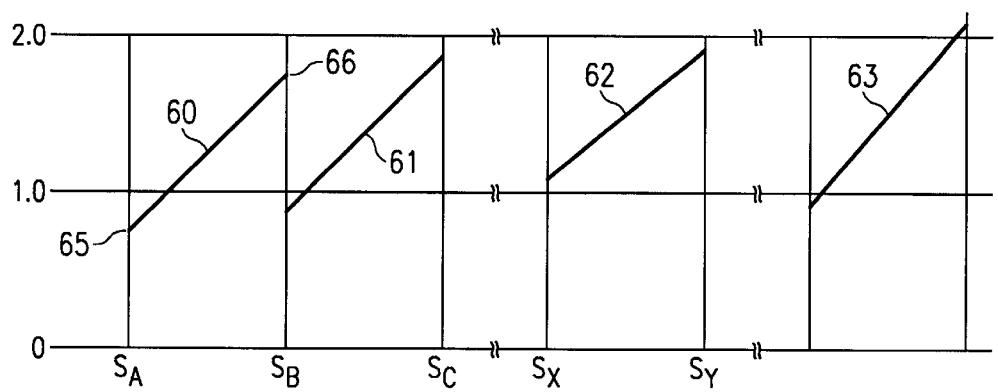
FIG. 5 is a graphical representation of an exemplary interpolation of the sample timing of the phase estimator of FIG. 4 in accordance with the data detection channel of FIG. 1.

An embodiment of the phase estimator 45 of FIG. 3 is illustrated in FIG. 4, and the methodology of the phase estimator 45 is graphically illustrated in FIG. 5.

Referring first to FIG. 1, the purpose of PLL 20 is to determine where the recorded signal write clock edges or transitions occurred. A digital PLL does this by mathematically tracking the waveform. An example of a digital PLL is coassigned U.S. Pat. No. 5,442,315, Hutchins, dated Aug. 15, 1995. At each sample 19, an output PHASE register is incremented by the nominal phase associated with the write clock. The nominal relationship between the write clock and the read oscillator 18 is known and controls the incrementing rate. Additionally, the PHASE register is modified slightly by an error signal. The PLL compares where the write clock boundaries are located with the location of the peaks (transitions) as read from the tape. If there is an error, the PLL generates an error signal and adds it to the PHASE register. Thus, the output phase register is continually updated by both the nominal size of the write clock plus the error signal.

As the PHASE is incrementing, the relationship between the number stored in the PHASE register and the write clock boundaries is one to one, with write clock boundaries separated by integral distances. However, the number in the PHASE register rarely is exactly an integer value. The identification of the write clock boundaries is the timing at which the PHASE register crosses an integer boundary. Further, the PHASE register is prevented from overflowing by a continual normalization, for example, at every read sample clock.

Thus, as illustrated in FIG. 5, the outputs of the PHASE register 60 and 61 increment upwards and are normalized by decreasing by a value of 1.0 at each read sample (e.g., sample $S_B$). Other outputs 62 and 63 also increment upward and will be discussed hereinafter. FIG. 5 illustrates a linear incrementing of the phase registers, however, they may be incremented non-linearly, such as by steps.

The phase estimator 45 of FIG. 4 identifies the write clock boundaries by comparing the PHASE register output at one read clock to the output of the PHASE register at the previous read clock, called PHASE1. These numbers are received from the PLL at input 41. Referring to FIG. 5, if the prior PHASE1 output 65 was less than 1.0, and the present PHASE output 66 is greater than 1.0, the PHASE has crossed an integer boundary, which the PLL has identified as the synchronous write clock boundary. The PHASE1 and PHASE outputs for the PHASE 62 did not cross an integer boundary. The PHASE1 and PHASE outputs for the PHASE 63 are respectively less than 1.0 and greater than 2.0, indicating that two integer boundaries have been crossed.

The function of the phase estimator 45 of FIG. 4 is to identify the single write clock boundary crossings and to then estimate the timing offset of the crossed write clock boundary with respect to the sample time. The embodiment illustrated in FIG. 4 employs straight line interpolation to estimate the timing offset, in accordance with the following equations:

If (PHASE$\geq$1) and (PHASE1<1) then TQUAL=1;

TSAMP=(1-PHASE1)/(PHASE-PHASE1).

If (PHASE$\geq$2) and (PHASE1<2) then TQUAL=1;

TSAMP=(2-PHASE1)/(PHASE-PHASEL).

Else TQUAL=0; TSAMP=0.

Where TQUAL=1 means that TSAMP is qualified in that only a single synchronous write clock boundary has been crossed, and that TSAMP is the calculated offset between the synchronous write clock boundary and the read samples. TQUAL=0 means that either no write clock boundary was crossed, or that 2 write clock boundaries were crossed and that TSAMP is not valid.

In FIG. 4, a gate 70 indicates that PHASE>1 and PHASE<1, sets TQUAL at register 71, and inserts the "1" in the TSAMP equation at circuit 72. The remainder of the calculation is conducted by logic 73, and the result is set in register 74. Gate 75 indicates that PHASE$\geq$2 and PHASE1<2, and sets TQUAL at register 71. The "0" state of circuit 72 inserts the "2" in the TSAMP calculation, which is conducted by logic 73 and set in register 74. The content of registers 71 and 74 are provided, respectively, on outputs 78 and 79. Thus, output 79 TSAMP comprises the offset timing of the synchronous write clock boundary with respect to the sample timing.

Figure 6:
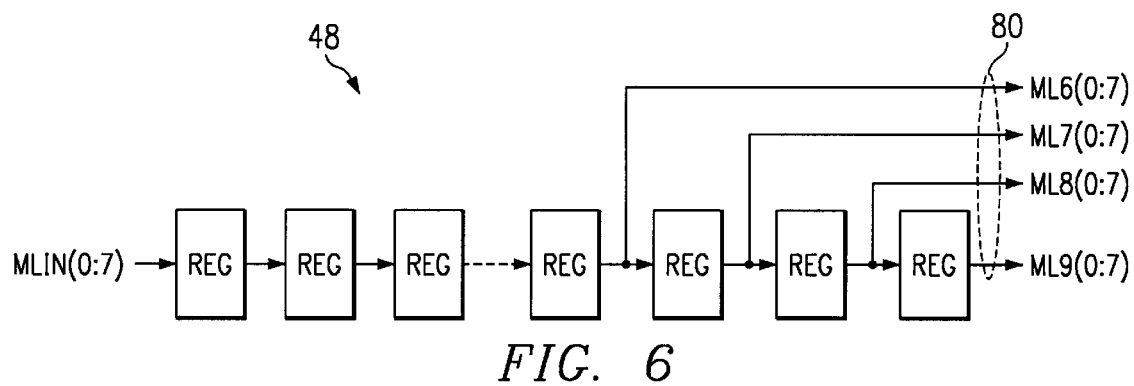
FIG. 6 is a block diagram of an embodiment of delay matching circuitry of FIG. 3.

In FIG. 6, the registers of the delay matching circuit 48 store sequential sample amplitudes of the input signal and are sequenced at each sample time. Much of the delay is to compensate for the time required to conduct the calculation of the offset timing, and additionally to provide four sequential samples at the ML6–ML9 outputs 80 simultaneously for use in additional calculation, as will be explained.

Figure 7:
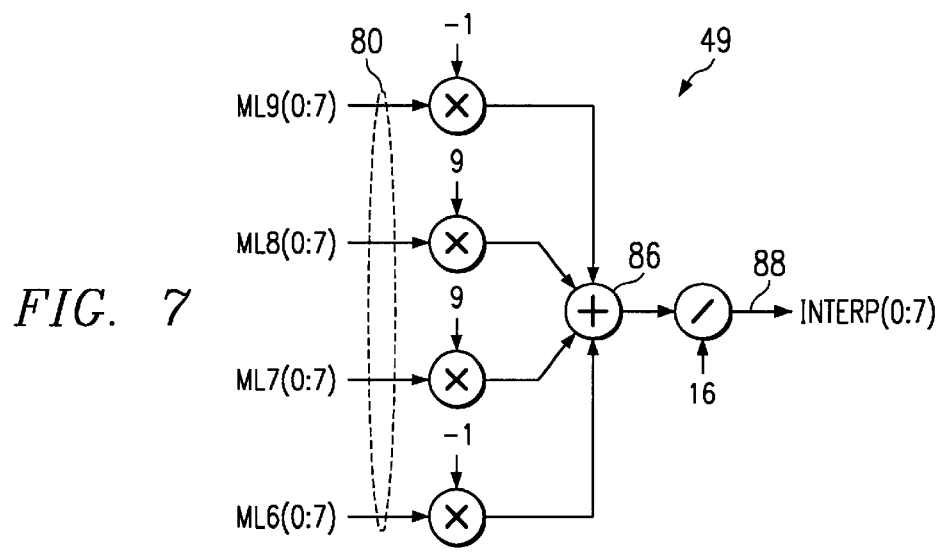
FIG. 7 is a block diagram of an embodiment of a midpoint interpolator of FIG. 3.
Figure 9:
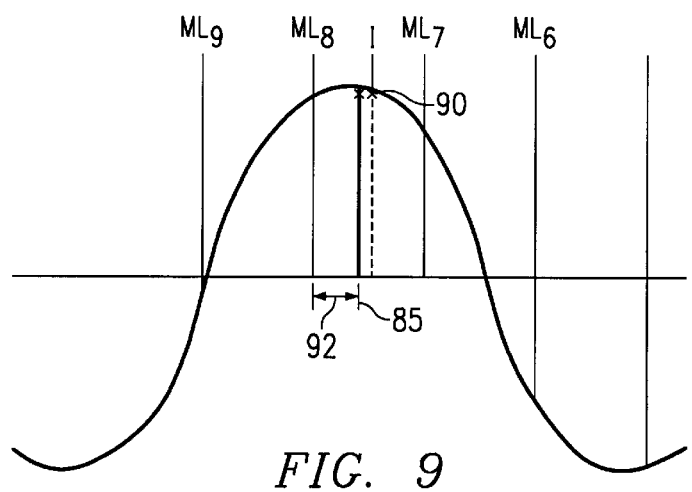
FIG. 9 is a graphical representation of an exemplary input signal together with the samples thereof appearing in the synchronous interface of FIGS. 3–8.

FIG. 7 illustrates an example of a midpoint interpolator 49 in accordance with the incorporated '124 application. Referring additionally to FIG. 9, the arrangement of FIG. 7 interpolates between the sample of ML8 and the subsequent sample of ML7, to provide an additional set of pseudo samples which may increase the accuracy of the estimate of the amplitude of the input signal at the estimated synchronous write clock boundary 85. The midpoint is designated as I. The midpoint interpolator of FIG. 7 sums 86 the weighted values of ML6–ML9, where ML7 and ML8 are weighted by multiplying by 9 and ML6 and ML9 are weighted oppositely by multiplying by −1. The sum is then averaged by dividing by 16, and the result provided at INTERP output 88. Referring to FIG. 9, amplitude 90 may comprise the midpoint as calculated by the midpoint interpolator 49.

Other weightings and calculations may alternatively be employed to provide midpoint interpolation in accordance with the incorporated '124 application.

Figure 8:
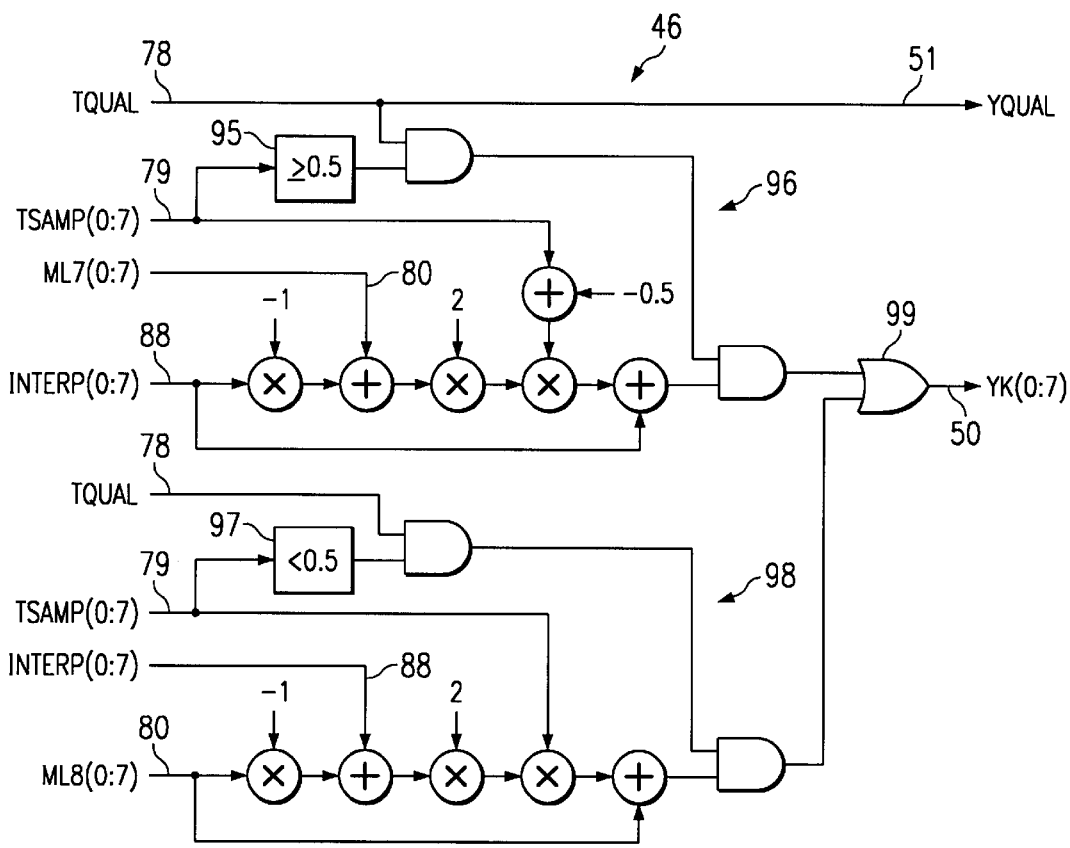
FIG. 8 is a block diagram of an embodiment of a sample interpolator of FIG. 3.

FIGS. 8 and 9 illustrate an embodiment of the sample interpolator 46 of FIG. 3, which utilizes the midpoint interpolator 49. The sample interpolator (or estimator to encompass alternative means of calculation other than interpolation) is coupled to the asynchronous channel sample delayed outputs 80 for ML8 and ML7, which represent the input signal samples bounding the input signal synchronous write clock boundary 85, as determined by the phase estimator 45. The sample interpolator 46 estimates, from two sequential asynchronous samples (e.g., the samples ML8 and ML7) bounding an input signal synchronous write clock boundary (e.g., boundary 85) (the estimate improved by adding the midpoint estimate), the input signal amplitudes at the estimated timing offset 92 from the asynchronous samples. Thus, the estimated input signal amplitudes are thereby substantially synchronized with the input signal synchronous write clock boundaries.

FIG. 8 incorporates two logic calculation circuits for calculating the estimated signal amplitude on either side of the midpoint. Thus, if TSAMP 79 is ≧0.5, per block 95, the input signal synchronous write clock boundary is between the midpoint I and ML7, and the input signal amplitude estimate is calculated by logic circuit 96 employing ML7 from output 80. Alternatively, if TSAMP 79 is <0.5, per block 97, the input signal synchronous write clock boundary is between the midpoint I and ML8, and the input signal amplitude estimate is calculated by logic circuit 98 employing ML8 from output 80.

The equations for the operation of the embodiment of FIG. 8 is as follows:

If (TQUAL=1) and (TSAMP<0.5), then YK=((INTERP−ML8)*2*TSAMP))+ML8.

If (TQUAL=1) and (TSAMP≧0.5), then YK=((ML7−INTERP)*2*(TSAMP−0.5))+INTERP.

The illustrated embodiment is a linear interpolation, but other calculations to provide appropriate estimates may be envisioned by those of skill in the art.

The estimated value of the input signal amplitude at the synchronous write clock boundary from logic 96 or from logic 98 is provided at OR 99 and on output 50, and the qualification signal, indicating that the value on output 50 is valid, is supplied on output 51.

Referring to FIGS. 3 and 9, the present invention provides a synchronous interface 35 for an asynchronous channel, the synchronous interface presenting estimated synchronous samples 50 at estimated write clock boundaries 85.

While the preferred embodiments of the present invention have been illustrated in detail, it should be apparent that modifications and adaptations to those embodiments may occur to one skilled in the art without departing from the scope of the present invention as set forth in the following claims.

I claim:

1. A synchronous interface for an asynchronous channel, said channel providing asynchronous samples of an input signal, said input signal having synchronous write clock boundaries, comprising:

a phase estimator coupled to said asynchronous channel for estimating timing offset of said input signal synchronous write clock boundaries from said asynchronous samples; and a sample estimator coupled to said asynchronous channel and to said phase estimator for estimating, from two sequential said asynchronous samples bounding an input signal synchronous write clock boundary, said input signal amplitudes at said estimated timing offset from said asynchronous samples, said estimated input signal amplitudes thereby substantially synchronized with said input signal synchronous write clock boundaries.

2. The synchronous interface of claim 1, wherein said asynchronous channel comprises a sample clock to provide clock signals for said asynchronous samples, wherein said asynchronous channel identifies said synchronous write clock boundaries of said input signal, and wherein said phase estimator interpolates between sequential said sample clocks for determining said estimated timing offset of said input signal synchronous write clock boundaries.

3. The synchronous interface of claim 2, wherein said asynchronous channel sample clock operates at a nominal frequency greater than that of said input signal synchronous write clock frequency, and wherein said phase estimator additionally comprises a signal qualification circuit which identifies said synchronous write clock boundaries appearing singly between two of said asynchronous samples.

4. The synchronous interface of claim 2, wherein said sample estimator interpolates the amplitude of said input signal between said two sequential asynchronous samples, at said estimated timing offset from said asynchronous samples.

5. The synchronous interface of claim 4, wherein said sample estimator additionally comprises a midpoint estimator which estimates the midpoint between said two sequential asynchronous samples, and interpolates the amplitude of said input signal between said midpoint and the one of said two sequential asynchronous samples closest to said estimated timing offset.

6. In a detection channel for detecting recorded run length encoded data signals, said data having synchronous write clock boundaries, said channel having a sample detector providing asynchronous digital samples of said recorded run length encoded data signals, said asynchronous digital samples generated by a fixed sample clock, a synchronous interface for providing estimated synchronous samples of said recorded run length encoded data signals, comprising:

a phase interpolator coupled to said channel sample clock, for interpolating between the sample timing of two sequential said asynchronous digital samples for estimating the timing offset of said synchronous write clock boundaries of said recorded run length encoded data signals from said asynchronous samples; and a digital sample interpolator coupled to said sample detector and to said phase interpolator for interpolating, from two sequential said asynchronous digital samples bounding a data synchronous write clock boundary, said recorded run length encoded data signal amplitude at said estimated timing offset from said asynchronous digital samples.

7. The synchronous interface of claim 6, wherein said channel sample clock operates at a nominal frequency greater than that of said data synchronous write clock frequency, and wherein said phase interpolator additionally comprises a signal qualification circuit which identifies said write clock boundaries appearing singly between two of said asynchronous samples, said phase interpolator interpolating said timing offset of only said singly appearing write clock boundaries.

8. The synchronous interface of claim 6, wherein said sample interpolator additionally comprises a digital midpoint estimator which estimates the midpoint between said two sequential asynchronous digital samples, and wherein said sample interpolator comprises a digital interpolator, for interpolating the amplitude of said recorded run length encoded data signal between said midpoint and the one of said two sequential asynchronous digital samples closest to said estimated timing offset.

9. In a maximum likelihood detection channel for detecting recorded magnetic PRML signals, said PRML signals having synchronous write clock boundaries, said channel having a sample detector providing asynchronous digital samples of said PRML signals, said asynchronous digital samples generated by a fixed sample clock, a synchronous interface for providing estimated synchronous samples of said PRML signals, comprising:

a digital PLL coupled to said sample detector for determining said synchronous write clock boundaries of said recorded magnetic PRML signals;

a digital phase interpolator coupled to said PLL for interpolating between the sample timing of two sequential said asynchronous digital samples for estimating the timing offset of said PLL determined synchronous write clock boundaries from said asynchronous samples; and a digital sample interpolator coupled to said sample detector and to said phase interpolator for interpolating, from two sequential said asynchronous samples bounding a PLL detected synchronous write clock boundary, said recorded PRML signal amplitude at said estimated timing offset from said asynchronous digital samples.

10. The synchronous interface of claim 9, wherein said channel sample clock operates at a nominal frequency greater than that of said data synchronous write clock frequency, and wherein said phase interpolator additionally comprises a signal qualification circuit which identifies said write clock boundaries appearing singly between two of said asynchronous digital samples, said digital phase interpolator interpolating said timing offset of only said singly appearing PLL determined write clock boundaries.

11. The synchronous interface of claim 9, wherein said sample interpolator additionally comprises a digital midpoint estimator which estimates the midpoint between said two sequential asynchronous digital samples, and wherein said sample interpolator comprises a digital interpolator, for interpolating the amplitude of said recorded PRML signal between said midpoint and the one of said two sequential asynchronous digital samples closest to said estimated timing offset.

12. A method for providing synchronous sample estimates of a synchronous input signal, from asynchronous samples of said input signal, wherein said synchronous input signal comprises a signal format having synchronous write clock boundaries, comprising the steps of:

estimating the synchronous timing of said asynchronous samples, wherein said step of estimating said timing of said asynchronous samples comprises estimating the timing offset of said input signal write clock boundaries from said asynchronous samples; and estimating, from two sequential said asynchronous samples, said input signal at said estimated synchronous timing.

13. The method for providing synchronous sample estimates of claim 12, wherein said step of estimating said input signal comprises estimating, from two sequential said asynchronous samples bounding an input signal synchronous write clock boundary, said input signal amplitudes at said estimated timing offset from said asynchronous samples.

14. The method for providing synchronous sample estimates of claim 13, comprising the additional step of identifying said synchronous write clock boundaries appearing singly between two of said asynchronous samples, and, wherein said step of estimating said input signal comprises estimating said signal only from two sequential said asynchronous samples bounding a single said synchronous write clock boundary.

15. The method for providing synchronous sample estimates of claim 14, wherein:

said step of estimating said timing of said asynchronous samples comprises interpolating between sequential said sample clocks for estimating the timing offset of said input signal write clock boundaries from said asynchronous samples; and said step of estimating said input signal comprises interpolating the amplitude of said input signal between said two sequential asynchronous samples, at said estimated timing offset from said asynchronous samples.

16. A digital data channel for detecting recorded run length encoded data signals and for detecting recorded PRML encoded data signals, comprising:

a sample detector providing asynchronous samples of said recorded data signals;

a digital peak detector coupled to said sample detector for detecting said recorded run length encoded data signals, said digital peak detector including a PLL for determing synchronous write clock boundaries of said recorded data signals;

a digital phase interpolator coupled to said PLL for interpolating between the sample timing of two sequential said asynchronous digital samples for estimating the timing offset of said PLL determined synchronous write clock boundaries from said asynchronous samples;

a digital sample interpolator coupled to said sample detector and to said phase interpolator for interpolating, from two sequential said asynchronous samples bounding a PLL detected synchronous write clock boundary, said recorded PRML signal amplitude at said estimated timing offset from said asynchronous digital samples; and an ML detector coupled to said digital sample interpolator for detecting said PRML encoded data signals.

* * * * *